United States Patent
Kuk et al.

(10) Patent No.: US 11,504,655 B2
(45) Date of Patent: Nov. 22, 2022

(54) BACKWASHING SUCTION DEVICE FOR FABRIC FILTRATION APPARATUS

(71) Applicant: GRENEX Limited, Seoul (KR)

(72) Inventors: Chungchang Kuk, Seoul (KR); Younglong Kuk, Seoul (KR)

(73) Assignee: GRENEX LIMITED, Seoul (KR)

( * ) Notice: Subject to any disclaimer, the term of this patent is extended or adjusted under 35 U.S.C. 154(b) by 100 days.

(21) Appl. No.: 17/174,371

(22) Filed: Feb. 12, 2021

(65) Prior Publication Data

US 2021/0283537 A1    Sep. 16, 2021

(30) Foreign Application Priority Data

Mar. 10, 2020    (KR) .......................... 10-2020-0029357

(51) Int. Cl.
*B01D 33/50* (2006.01)
*B01D 33/21* (2006.01)
*B01D 33/46* (2006.01)

(52) U.S. Cl.
CPC ........... *B01D 33/503* (2013.01); *B01D 33/21* (2013.01); *B01D 33/461* (2013.01); *B01D 33/468* (2013.01)

(58) Field of Classification Search
None
See application file for complete search history.

(56) References Cited

U.S. PATENT DOCUMENTS

| | | | | |
|---|---|---|---|---|
| 1,283,925 A | * | 11/1918 | Salisbury | B01D 33/21 210/395 |
| 1,649,220 A | * | 11/1927 | Goodloe | B01D 46/26 55/408 |
| 1,649,581 A | * | 11/1927 | Gentep | B01D 33/21 210/791 |
| 1,685,118 A | * | 9/1928 | Campbell | B01D 33/21 210/216 |
| 1,796,492 A | * | 3/1931 | Sweetland | B01D 33/463 210/395 |
| 1,833,315 A | * | 11/1931 | Burhans | B01D 35/10 210/393 |
| 1,968,741 A | * | 7/1934 | Burrell | B01D 33/503 210/392 |

(Continued)

FOREIGN PATENT DOCUMENTS

| | | |
|---|---|---|
| KR | 10-1177369 B1 | 8/2012 |
| KR | 10-1398838 B1 | 5/2014 |
| KR | 10-2018-0020500 A | 2/2018 |

*Primary Examiner* — Robert J Popovics
(74) *Attorney, Agent, or Firm* — Bacon & Thomas, PLLC

(57) ABSTRACT

A backwashing suction device for a fabric filtration apparatus, and more particularly, a backwashing suction device for a fabric filtration apparatus in which an edge surface of a suction slit through which pile threads exit is inclined to form a slope so that the pile threads introduced into the suction slit when a fiber disk filter is rotated for backwashing come into contact with the slope and thus the amount of angular rotation of the pile threads is increased to increase the backwashing effect. Also, since a plurality of friction protrusions are formed to protrude from the slope, the effect of removing foreign substances can be further enhanced through the effect of rubbing and washing the pile threads on a washboard while the pile threads ascend over each of the friction protrusions one by one.

4 Claims, 8 Drawing Sheets

(56) References Cited

U.S. PATENT DOCUMENTS

| | | | | |
|---|---|---|---|---|
| 1,977,601 A | * | 10/1934 | Winton | F16L 55/24 210/411 |
| 1,995,648 A | * | 3/1935 | Rathbun | B01D 46/681 210/411 |
| 2,066,479 A | * | 1/1937 | Macisaac | B01D 29/01 210/414 |
| 2,076,980 A | * | 4/1937 | Cooper | B01D 39/083 210/508 |
| 2,167,322 A | * | 7/1939 | Cuno | B01D 29/682 210/392 |
| 2,275,958 A | * | 3/1942 | Hagel | B01D 35/16 210/414 |
| 2,310,587 A | * | 2/1943 | Macneill | B01D 29/055 210/411 |
| 2,506,669 A | * | 5/1950 | Heuacker | E03C 1/264 220/86.3 |
| 2,747,741 A | * | 5/1956 | Jacobson | B01D 29/46 210/411 |
| 2,835,390 A | * | 5/1958 | King | B01D 29/25 210/791 |
| 2,918,172 A | * | 12/1959 | Kinney | F04B 53/1037 210/392 |
| 3,017,029 A | * | 1/1962 | Berninger | B01D 29/684 210/411 |
| 3,074,556 A | * | 1/1963 | Rosaen | B01D 33/11 210/392 |
| 3,074,560 A | * | 1/1963 | Kinney | B01D 33/11 210/392 |
| 3,131,145 A | * | 4/1964 | Rosaen | B01D 29/15 210/197 |
| 3,168,467 A | * | 2/1965 | Dreyer | B01D 29/60 210/138 |
| 3,256,995 A | * | 6/1966 | Schmid | B01D 29/682 210/485 |
| 3,345,805 A | * | 10/1967 | Sherrill | B01D 46/26 55/290 |
| 3,347,379 A | * | 10/1967 | Miller | B01D 33/06 210/402 |
| 3,357,566 A | * | 12/1967 | Schmid | B01D 29/682 210/411 |
| 3,377,780 A | * | 4/1968 | Noland | B01D 46/12 55/294 |
| 3,393,262 A | * | 7/1968 | Durso | B01D 29/0075 210/791 |
| 3,574,509 A | * | 4/1971 | Zentis | B01D 29/682 210/415 |
| 3,635,348 A | * | 1/1972 | Carr | B01D 29/35 210/333.1 |
| 3,734,299 A | * | 5/1973 | Akiyama | B01D 29/682 210/336 |
| 3,757,496 A | * | 9/1973 | Berg | B01D 46/682 55/501 |
| 3,759,392 A | * | 9/1973 | Syrjanen | B01D 29/682 210/415 |
| 3,784,016 A | * | 1/1974 | Akiyama | B01D 29/682 210/333.1 |
| 3,784,017 A | * | 1/1974 | Arnold | B01D 33/801 210/402 |
| 3,887,344 A | * | 6/1975 | Smith | B01D 46/2411 55/296 |
| 3,948,779 A | * | 4/1976 | Jackson | B01D 33/23 210/331 |
| 3,977,847 A | * | 8/1976 | Clark | B01D 46/28 428/95 |
| 3,985,656 A | * | 10/1976 | Arvanitakis | B01D 29/6415 210/396 |
| 4,085,051 A | * | 4/1978 | Kaminsky | B01D 29/54 210/411 |
| 4,090,965 A | * | 5/1978 | Fuchs | B01D 33/21 210/402 |
| 4,162,219 A | * | 7/1979 | Miropolsky | B01D 29/055 210/414 |
| 4,167,482 A | * | 9/1979 | Muller | B01D 46/28 210/411 |
| 4,220,458 A | * | 9/1980 | Koppelman | B01D 46/34 55/408 |
| 4,251,237 A | * | 2/1981 | Smith | B01D 46/682 95/278 |
| 4,301,554 A | * | 11/1981 | Wojcicki | E03C 1/282 4/256.1 |
| 4,303,522 A | * | 12/1981 | Ducasse | C13B 30/04 210/397 |
| 4,315,820 A | * | 2/1982 | Mann | B01D 29/688 210/411 |
| 4,358,370 A | * | 11/1982 | Jameson | B01D 29/15 210/485 |
| 4,518,501 A | * | 5/1985 | Lennartz | B01D 29/684 210/411 |
| 4,601,826 A | * | 7/1986 | Christophe | B01D 29/413 210/426 |
| 4,643,828 A | * | 2/1987 | Barzuza | B01D 29/686 210/414 |
| 4,671,976 A | * | 6/1987 | Vidal | E03C 1/264 4/293 |
| 4,702,847 A | * | 10/1987 | Fux | B01D 29/15 210/411 |
| 4,725,292 A | * | 2/1988 | Williams | B01D 46/26 95/278 |
| 4,818,402 A | * | 4/1989 | Steiner | B01D 29/445 210/411 |
| 4,867,879 A | * | 9/1989 | Muller | B01D 35/02 210/392 |
| 4,898,671 A | * | 2/1990 | Fux | B01D 29/52 210/411 |
| 4,999,858 A | * | 3/1991 | Wu | E03C 1/26 4/290 |
| 5,087,358 A | * | 2/1992 | Massignani | B01D 33/15 69/29 |
| 5,128,029 A | * | 7/1992 | Herrmann | B01D 33/805 210/500.1 |
| 5,139,670 A | * | 8/1992 | Hirs | B01D 33/50 210/402 |
| 5,152,891 A | * | 10/1992 | Netkowicz | B01D 29/23 55/498 |
| 5,181,945 A | * | 1/1993 | Bodovsky | B01D 46/26 55/528 |
| 5,268,095 A | * | 12/1993 | Barzuza | B01D 29/688 210/411 |
| 5,300,225 A | * | 4/1994 | Fischer | A01K 63/045 210/402 |
| 5,362,401 A | * | 11/1994 | Whetsel | B01D 33/804 210/791 |
| 5,464,542 A | * | 11/1995 | Grienberger | B01D 29/688 210/791 |
| 5,474,598 A | * | 12/1995 | Harpole, Jr. | B01D 46/26 95/278 |
| 5,503,737 A | * | 4/1996 | Luthi | B01D 33/82 210/138 |
| 5,560,835 A | * | 10/1996 | Williams | B01D 46/22 210/791 |
| 5,587,074 A | * | 12/1996 | Lynch | B01D 29/23 210/411 |
| 5,618,423 A | * | 4/1997 | Lin | B01D 33/073 210/402 |
| 5,624,557 A | * | 4/1997 | Maurer | B01D 29/055 210/411 |
| 5,632,903 A | * | 5/1997 | Caracciolo, Jr. | B01D 29/688 210/411 |
| 5,635,066 A | * | 6/1997 | Maurer | B01D 29/055 210/411 |
| 5,679,136 A | * | 10/1997 | Phillips | B01D 46/0056 95/278 |
| 5,814,114 A | * | 9/1998 | Stueble | B01D 46/682 55/284 |
| 5,824,229 A | * | 10/1998 | Larkey | B01D 29/682 210/791 |
| 5,855,794 A | * | 1/1999 | Caracciolo, Jr. | B01D 33/503 210/791 |

(56) References Cited

U.S. PATENT DOCUMENTS

| | | | | |
|---|---|---|---|---|
| 5,876,612 A * | 3/1999 | Astrom | B01D 29/688 | 210/791 |
| 5,906,752 A * | 5/1999 | Williams | B01D 46/22 | 210/791 |
| 5,914,048 A * | 6/1999 | Chase | D21D 5/046 | 210/90 |
| 5,951,878 A * | 9/1999 | Astrom | B01D 33/21 | 210/197 |
| 6,090,298 A * | 7/2000 | Weis | B01D 33/463 | 210/791 |
| 6,103,132 A * | 8/2000 | Seyfried | B01D 33/073 | 210/791 |
| 6,136,202 A * | 10/2000 | Foreman | B01D 33/073 | 210/791 |
| 6,217,782 B1 * | 4/2001 | Tuori | B01D 29/6438 | 210/785 |
| 6,284,136 B1 * | 9/2001 | Tuori | B01D 33/54 | 210/785 |
| 6,294,098 B1 * | 9/2001 | Bergmann | B01D 33/503 | 210/791 |
| 6,337,013 B1 * | 1/2002 | Koopmans | B01D 29/54 | 210/450 |
| 6,360,896 B1 * | 3/2002 | Schildmann | B01D 29/688 | 210/414 |
| 6,497,815 B1 * | 12/2002 | Koller | B01D 29/014 | 210/415 |
| 6,500,331 B2 * | 12/2002 | Massignani | B01D 33/39 | 210/330 |
| 6,508,942 B2 * | 1/2003 | Morimura | B01D 35/10 | 210/483 |
| 6,543,624 B1 * | 4/2003 | Geisbauer | B01D 29/70 | 210/411 |
| 6,572,763 B2 * | 6/2003 | Gorshing | B01D 29/115 | 210/162 |
| 6,776,295 B2 * | 8/2004 | Morimura | B01D 35/10 | 210/791 |
| 6,808,076 B2 * | 10/2004 | Villares Lenz Cesar | B01D 33/073 | 210/402 |
| 6,858,140 B2 * | 2/2005 | Smith | B01D 29/39 | 210/411 |
| 6,981,338 B2 * | 1/2006 | Jensen | A47L 7/0042 | 34/92 |
| 7,258,238 B2 * | 8/2007 | Raghupathy | B01D 29/35 | 210/411 |
| D550,819 S * | 9/2007 | Seehoff | D23/261 | |
| 7,297,265 B1 * | 11/2007 | Booth | B01D 29/688 | 210/411 |
| 7,537,689 B2 * | 5/2009 | Ricketts | B01D 29/23 | 210/121 |
| 7,678,284 B2 * | 3/2010 | Ricketts | B01D 29/54 | 210/791 |
| 7,807,050 B2 * | 10/2010 | Baumann | B01D 29/52 | 210/333.1 |
| 7,820,062 B2 * | 10/2010 | Ricketts | B01D 29/6446 | 210/791 |
| 7,833,424 B1 * | 11/2010 | Baumann | B01D 29/96 | 210/791 |
| 7,871,527 B2 * | 1/2011 | Smith | B01D 29/39 | 210/791 |
| 7,981,290 B2 * | 7/2011 | Baumann | B01D 29/688 | 210/333.1 |
| 8,043,498 B2 * | 10/2011 | Rueda | E03F 5/0404 | 210/348 |
| 8,048,296 B2 * | 11/2011 | Stevens | B01D 29/39 | 210/345 |
| 8,348,063 B2 * | 1/2013 | Pracher | B01D 29/682 | 210/411 |
| 8,496,117 B2 * | 7/2013 | Leath, III | B01D 33/463 | 210/396 |
| 8,640,883 B2 * | 2/2014 | Doig | B01D 29/682 | 210/791 |
| 8,678,199 B2 * | 3/2014 | Keller | B01D 29/54 | 210/411 |
| 8,778,174 B2 * | 7/2014 | Xia | B01D 29/684 | 210/791 |
| 8,852,445 B2 * | 10/2014 | Xia | B01D 29/684 | 210/791 |
| 8,945,379 B2 * | 2/2015 | Brull | E04H 4/1245 | 210/411 |
| D730,493 S * | 5/2015 | Sehl | D23/261 | |
| 9,211,489 B2 * | 12/2015 | Riggers | B08B 5/04 | |
| 9,221,000 B2 * | 12/2015 | Doig | B01D 29/114 | |
| 9,352,255 B2 * | 5/2016 | Kuk | B01D 29/66 | |
| 9,561,454 B2 * | 2/2017 | Browning | B01D 29/035 | |
| 9,566,541 B2 * | 2/2017 | König | F01M 11/03 | |
| 9,616,363 B2 * | 4/2017 | Osman Oguz | B01D 29/23 | |
| 9,808,747 B2 * | 11/2017 | Massignani | B01D 33/466 | |
| 9,962,633 B2 * | 5/2018 | Danneman | B01D 29/39 | |
| 9,968,872 B2 * | 5/2018 | Carayon | B01D 33/073 | |
| 10,035,085 B2 * | 7/2018 | Cartarius | B01D 29/668 | |
| 10,058,806 B2 * | 8/2018 | Tange | B01D 33/805 | |
| 10,195,549 B1 * | 2/2019 | Grabbe | B01D 29/688 | |
| 10,238,998 B2 * | 3/2019 | Cartarius | B01D 29/94 | |
| 10,245,531 B2 * | 4/2019 | Steiner | B01D 29/688 | |
| 10,267,027 B2 * | 4/2019 | D'Amico | A61L 9/05 | |
| 10,391,429 B2 * | 8/2019 | Carayon | B01D 33/503 | |
| 10,391,455 B2 * | 8/2019 | Liebermann | B01D 65/08 | |
| 10,549,224 B2 * | 2/2020 | Carayon | B01D 33/503 | |
| 10,583,379 B2 * | 3/2020 | Cote | B01D 33/11 | |
| 10,640,959 B2 * | 5/2020 | Malesky | A61L 9/042 | |
| 10,646,801 B2 * | 5/2020 | Tameroglu | B01D 29/6415 | |
| 10,688,419 B2 * | 6/2020 | Browning | B01D 29/688 | |
| 10,729,994 B2 * | 8/2020 | Svensson | B01D 33/42 | |
| 10,744,429 B2 * | 8/2020 | Oz | B01D 29/74 | |
| 10,751,764 B2 * | 8/2020 | Dagan | B08B 5/04 | |
| 10,780,378 B2 * | 9/2020 | Strasser | B01D 29/68 | |
| 10,888,807 B2 * | 1/2021 | Harden | B01D 33/41 | |
| 10,905,981 B2 * | 2/2021 | Dannemann | B01D 35/10 | |
| 10,905,982 B2 * | 2/2021 | Holmen | B63J 4/002 | |
| 10,905,985 B2 * | 2/2021 | Oz | B01D 29/66 | |
| 10,981,092 B2 * | 4/2021 | Lingen | B01D 29/23 | |
| 11,000,791 B2 * | 5/2021 | Jibert | B01D 33/463 | |
| 11,253,799 B2 * | 2/2022 | Mason | B01D 24/40 | |
| 11,278,826 B2 * | 3/2022 | Deutschmeyer | B01D 29/23 | |
| 2001/0017279 A1 * | 8/2001 | Massignani | B01D 33/39 | 210/327 |
| 2001/0054591 A1 * | 12/2001 | Gorshing | B01D 33/503 | 210/791 |
| 2003/0080072 A1 * | 5/2003 | Morimura | B01D 35/10 | 210/767 |
| 2003/0146171 A1 * | 8/2003 | Herrmann | B01D 29/055 | 210/411 |
| 2004/0112825 A1 * | 6/2004 | Villares Lenz Cesar | B01D 33/067 | 210/391 |
| 2004/0124158 A1 * | 7/2004 | Smith | B01D 29/39 | 210/791 |
| 2005/0000870 A1 * | 1/2005 | Ricketts | B01D 29/23 | 210/121 |
| 2005/0115911 A1 * | 6/2005 | Smith | B01D 29/39 | 210/791 |
| 2005/0126967 A1 * | 6/2005 | Berry, III | B01D 33/461 | 210/396 |
| 2005/0139557 A1 * | 6/2005 | Ricketts | B01D 29/54 | 210/791 |
| 2007/0090041 A1 * | 4/2007 | Berry, III | B01D 33/461 | 210/402 |
| 2008/0011666 A1 * | 1/2008 | Baumann | B01D 29/39 | 210/791 |
| 2008/0047885 A1 * | 2/2008 | Shiekelmacher | B01D 29/686 | 210/107 |
| 2008/0053889 A1 * | 3/2008 | Leath | B01D 33/11 | 210/393 |
| 2009/0026152 A1 * | 1/2009 | Collins | B01D 39/02 | 210/791 |
| 2009/0178976 A1 * | 7/2009 | Stevens | B01D 29/39 | 210/791 |

(56) References Cited

U.S. PATENT DOCUMENTS

| | | | |
|---|---|---|---|
| 2010/0038295 A1* | 2/2010 | Keller | B01D 29/15 210/409 |
| 2010/0163480 A1* | 7/2010 | Pracher | B01D 46/715 210/411 |
| 2010/0300957 A1* | 12/2010 | Baumann | B01D 29/684 210/411 |
| 2010/0300989 A1* | 12/2010 | Baumann | B01D 29/688 210/791 |
| 2011/0011790 A1* | 1/2011 | Doig | B01D 29/52 210/393 |
| 2011/0049027 A1* | 3/2011 | Rueda | E03F 5/0404 210/163 |
| 2011/0120960 A1* | 5/2011 | Smith | B01D 35/301 210/791 |
| 2012/0091065 A1* | 4/2012 | Xia | B01D 29/39 210/806 |
| 2012/0111788 A1* | 5/2012 | Leath, III | B01D 33/11 210/409 |
| 2012/0223028 A1* | 9/2012 | Dagan | B08B 5/04 210/791 |
| 2012/0248018 A1* | 10/2012 | Hopf | B01D 29/6423 210/159 |
| 2013/0032515 A1* | 2/2013 | Carayon | E03F 5/14 210/161 |
| 2013/0048553 A1* | 2/2013 | Kuk | B01D 29/68 210/411 |
| 2013/0087495 A1* | 4/2013 | Riggers | B01D 29/688 210/415 |
| 2013/0105415 A1* | 5/2013 | Xia | B01D 29/684 210/791 |
| 2013/0126408 A1* | 5/2013 | Konig | B01D 29/682 210/427 |
| 2013/0168330 A1* | 7/2013 | Strasser | B01D 37/02 210/791 |
| 2013/0306546 A1* | 11/2013 | Cartarius | B01D 29/682 210/411 |
| 2014/0048474 A1* | 2/2014 | Kuk | B01D 33/50 210/393 |
| 2014/0097145 A1* | 4/2014 | Browning | B01D 29/688 210/357 |
| 2014/0102992 A1* | 4/2014 | Doig | B01D 29/66 210/791 |
| 2014/0116965 A1* | 5/2014 | Cote | B01D 33/11 210/241 |
| 2014/0259344 A1* | 9/2014 | Muderlak | E03D 13/007 4/256.1 |
| 2015/0224429 A1* | 8/2015 | Massignani | B01D 33/463 210/247 |
| 2015/0265952 A1* | 9/2015 | Berry, IV | B01D 33/461 210/396 |
| 2016/0045871 A1* | 2/2016 | Liebermann | B01D 63/16 210/321.68 |
| 2016/0059156 A1* | 3/2016 | Dannemann | B01D 29/688 210/791 |
| 2016/0059157 A1* | 3/2016 | Dannemann | B01D 29/52 210/411 |
| 2016/0059158 A1* | 3/2016 | Dannemann | B01D 29/52 210/323.1 |
| 2016/0151726 A1* | 6/2016 | Cartarius | B01D 29/668 210/411 |
| 2016/0214039 A1* | 7/2016 | Tameroglu | B01D 29/35 |
| 2016/0215490 A1* | 7/2016 | Keune | E03D 13/005 |
| 2016/0305107 A1* | 10/2016 | Muderlak | E03C 1/264 |
| 2016/0367917 A1* | 12/2016 | Steiner | B01D 29/688 |
| 2017/0014736 A1* | 1/2017 | Osman Oguz | B01D 29/643 |
| 2017/0128860 A1* | 5/2017 | Cartarius | B01D 29/684 |
| 2017/0144087 A1* | 5/2017 | Browning | B01D 29/688 |
| 2018/0056214 A1* | 3/2018 | Cote | B01D 33/067 |
| 2018/0071663 A1* | 3/2018 | Carayon | B01D 33/073 |
| 2018/0078883 A9* | 3/2018 | Dannemann | B01D 29/684 |
| 2018/0305916 A1* | 10/2018 | Crevier | E03D 13/005 |
| 2019/0193126 A1* | 6/2019 | Dagan | B08B 5/04 |
| 2019/0240600 A1* | 8/2019 | Lingen | B01D 35/005 |
| 2019/0381430 A1* | 12/2019 | Lingen | B01D 29/232 |
| 2019/0388808 A1* | 12/2019 | Takahashi | B01D 29/688 |
| 2020/0038787 A1* | 2/2020 | Schlichter | B01D 29/94 |
| 2020/0038788 A1* | 2/2020 | Deutschmeyer | B01D 29/23 |
| 2020/0282345 A1* | 9/2020 | Jibert | B01D 33/76 |
| 2021/0008473 A1* | 1/2021 | Moon | B01D 33/503 |
| 2021/0046407 A1* | 2/2021 | Dedul | B01D 29/6446 |
| 2021/0170312 A1* | 6/2021 | Schlichter | B01D 29/52 |
| 2021/0283537 A1* | 9/2021 | Kuk | B01D 33/463 |

* cited by examiner (a)

(b)

(a)

(b)

FIG. 6A
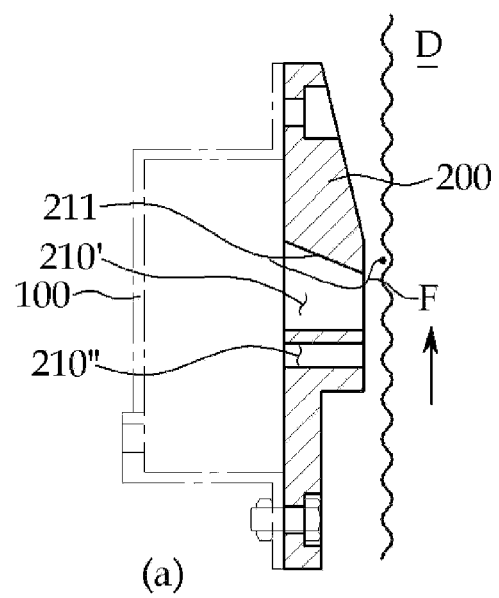
(a)
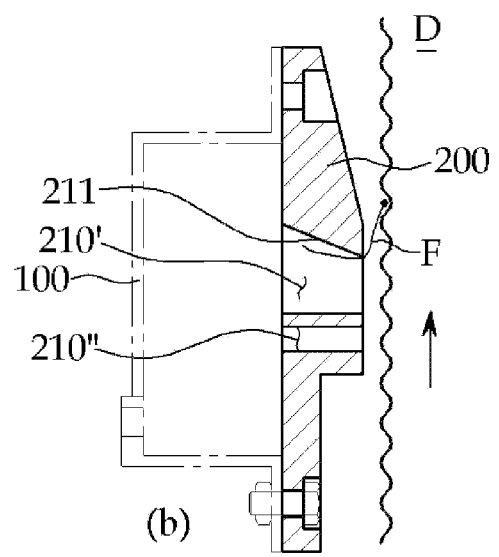
(b)
FIG. 6B

BACKWASHING SUCTION DEVICE FOR FABRIC FILTRATION APPARATUS

CROSS-REFERENCE TO RELATED APPLICATION

This application claims priority to and the benefit of Korean Patent Application No. 10-2020-0029357, filed Mar. 10, 2020, the disclosure of which is incorporated herein by reference in its entirety.

BACKGROUND

1. Field of the Invention

The present invention relates to a backwashing suction device for a fabric filtration apparatus, and more particularly, to a backwashing suction device for a fabric filtration apparatus in which an edge surface of a suction slit, through which pile threads exit, is inclined to form a slope so that the pile threads introduced into the suction slit when a fiber disk filter is rotated for backwashing come into contact with the slope and thus the amount of angular rotation of the pile threads is increased to increase the backwashing effect. The present invention also relates to a backwashing suction device for a fabric filtration apparatus in which a plurality of friction protrusions are formed to protrude from the slope so that the effect of removing foreign substances can be further enhanced through the effect of rubbing and washing the pile threads on a washboard while the pile threads ascend over each of the friction protrusions one by one.

2. Discussion of Related Art

In general, fabric filtration apparatuses refer to filtration apparatuses in which fibers (pile threads) are provided on a surface of a disk-shaped filter so that foreign substances are filtered while contaminated water or the like passes through the fibers. Such filtration apparatuses are equipped with a backwashing suction device that suctions and removes foreign substances adhered to the surface of a fiber disk filter in a backwashing manner, as shown in (Patent document 1) to (Patent document 3) below.

(Patent Document 1) Korean Patent Registration No. 10-1177369

It is an object to provide a backwashing suction apparatus in which, when the backwashing suction apparatus mounted in contact with a disk-shaped filter piece does not act to remove foreign substances adhered to fibers, etc., the backwashing suction apparatus is separated from the disk-shaped filter piece so that fibers on the disk-shaped filter piece can be prevented from being pressed by the backwashing suction apparatus for a long period of time and thus the filtering efficiency of fibers can be improved and the lifetime of the backwashing suction apparatus can be extended, and a fabric filtration apparatus using the same. In particular, it is another object of the present invention to provide a backwashing suction apparatus in which the backwashing suction apparatus is spaced apart from the disk-shaped filter piece using buoyancy so that the structure of the backwashing suction apparatus is simple and the backwashing suction apparatus can be easily operated and thus the backwashing suction apparatus can be pressed against or separated from the disk-shaped filter piece, and a fabric filtration apparatus using the same.

(Patent Document 2) Korean Patent Registration No. 10-1398838

It is an object to provide a backwashing suction apparatus in which the backwashing suction apparatus faces and comes into contact with the surface of a disk-shaped filter only when backwashing so that a necessary backwashing action is performed, thereby minimizing the time that the backwashing suction apparatus presses the fibers formed on the surface of the disk-shaped filter to improve the filtering efficiency of fibers, to extend the lifetime thereof and to reduce the energy required by reducing a rotational load caused by the pressing of the fibers, thereby reducing the size of a power transmission device required for the suction apparatus and making it compact, and a fabric filtration apparatus using the same. In particular, it is another object to provide a backwashing suction apparatus in which, by using a cylinder or a coil spring together with this cylinder, the backwashing suction apparatus is formed to be pressed against a disk-shaped filter only when backwashing, so that the backwashing suction apparatus is closely adhered to the disk-shaped filter with a simple structure yet easy to manufacture and easy to operate and thus the backwashing suction apparatus can be pressed against or separated from the disk-shaped filter, and a fabric filtration apparatus using the same. Also, it is another object to provide a backwashing suction apparatus in which two adjacent backwashing suction bars are operated as one cylinder (or together with a coil spring), thereby simplifying the overall configuration and making it possible to easily operate the backwashing suction apparatus, and a fabric filtration apparatus using the same.

(Patent Document 3) Korean Patent Laid-open Publication No. 10-2018-0020500

It is an object to provide a suction box for a backwashing apparatus of a fabric filtration apparatus in which a part, in which a main body and a suction plate are in contact with each other, is formed to be combined in a concave-convex form so that fluid does not leak without a sealing member and the main body and the suction plate are formed to be combined with each other by a hook method, thereby reducing the number of parts and reducing manufacturing time and cost. In particular, it is another object to provide a suction box for a backwashing apparatus of a fabric filtration apparatus in which, since the main body and the suction plate are injection-molded into plastic, it is possible to easily and quickly mass-produce a complex shape, as well as to reduce the manufacturing time and manufacturing cost of components.

However, such a backwashing suction apparatus according to the related art has the following problems.

(1) When foreign substances accumulate in a fiber disk filter according to a filtration action, a problem occurs in the filtration action of the filter, and thus the fiber disk filter needs to be properly backwashed.

In the case of backwashing, since filtered water is washed using already filtered water, the loss of filtered water occurs. In order to reduce this loss of filtered water, the fiber disk filter according to the related art needs to improve the backwashing efficiency.

(2) That is, when the backwashing efficiency is improved, it is possible to reduce the backwashing time and the amount of filtered water used for backwashing.

(3) Therefore, it is an important task to improve the backwashing efficiency in this technical field.

PRIOR-ART DOCUMENT

Patent Document (Patent document 1) Korean Patent Registration No. 10-1177369 (registered on Aug. 21, 2012)
(Patent document 2) Korean Patent Registration No. 10-1398838 (registered on May 19, 2014)
(Patent document 3) Korean Patent Laid-open Publication No. 10-2018-0020500 (published on Feb. 28, 2018)

SUMMARY OF THE INVENTION

The present invention is directed to a backwashing suction device for a fabric filtration apparatus in which an inner surface of an edge of a suction slit that comes in contact with a pile thread when the pile thread suctioned into the suction slit exits is inclined to form a slope so that the pile thread moves along the slope and the amount of rotation of the pile thread is increased to remove foreign substances adhered to the pile thread using an increase in the centrifugal force, thereby increasing the backwashing effect and easily removing the foreign substances from various types of pile threads.

In particular, the present invention is also directed to a backwashing suction device for a fabric filtration apparatus in which a plurality of friction protrusions are formed to protrude from a slope that a pile thread comes in contact with so that the effect of rubbing and washing the pile thread on a washboard can both be obtained and the backwashing effect can be increased even on various types of pile threads and the amount of backwashing water used can be reduced.

The present invention is also directed to a backwashing suction device for a fabric filtration apparatus in which long friction protrusions protrude side by side in a length direction of a suction slit so that the friction and rubbing effect can be obtained while a pile thread ascends over the friction protrusions one by one, thereby further increasing the effect of removing foreign substances adhered to the pile thread.

According to an aspect of the present invention, there is provided a backwashing suction device for a fabric filtration apparatus, the backwashing suction device including a suction body (100) formed in a container shape and having a drain hole (110) through which contents inside the suction body (100) are discharged to the outside, and a suction plate (200) mounted on the suction body (100) so that an inlet portion of the suction body (100) is closeable and having at least one main slit (210') and at least one sub-slit (210") to perform backwashing, wherein the main slit (210') forms a slope (211) so that an inner surface of an edge through which pile threads (F) introduced into the main slit (210') exit is gradually widened in an inward direction from an inlet of the main slit (210').

In particular, a plurality of friction protrusions (211') may be formed to protrude from the entire slope (211).

In this case, the plurality of friction protrusions (211') may be long and formed to protrude in a length direction of the main slit (210').

According to another aspect of the present invention, there is provided a backwashing suction device for a fabric filtration apparatus, the backwashing suction device including a suction body (100) formed in a container shape and having a drain hole (110) through which contents inside the suction body (100) are discharged to the outside, and a suction plate (200) mounted on the suction body (100) so that an inlet portion of the suction body (100) is closeable and having at least one suction slit (210) to perform backwashing, wherein the suction slit (210) forms a slope (211) so that an inner surface of an edge through which pile threads (F) introduced into the suction slit (210) exit is gradually widened in an inward direction from an inlet of the suction slit (210).

In particularly, a plurality of friction protrusions (211') may be formed to protrude from the entire slope (211). In this case, the plurality of friction protrusions (211') may be long and formed to protrude in a length direction of the suction slit (210).

Last, an angle between the slope (211) and an outer surface of the suction plate (200) may be in the range of 5° to 30°.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 4A, 4B, 5A, 5B, 6A, and 6B are cross-sectional views for describing operations of the backwashing suction device according to Embodiment 1 of the present invention;

DETAILED DESCRIPTION OF INVENTION

Figure 1:
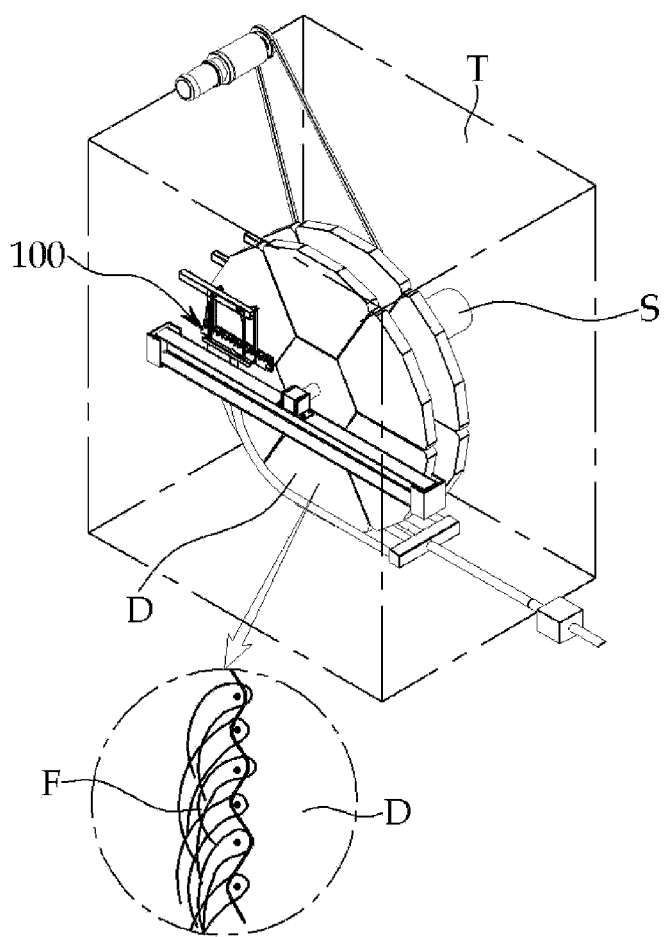
FIG. 1 is a perspective view schematically illustrating an example of a fabric filtration apparatus to which a backwashing suction device according to Embodiment 1 of the present invention is applied.

Hereinafter, exemplary embodiments of the present invention will be described with reference to the accompanying drawings. Prior to this, the terms or words used in the present specification and claims should not be construed as limited to their usual or dictionary meanings and should be interpreted as having a meaning and concept consistent with the technical idea of the present invention according to the principle that the inventors shall appropriately define the concept of the terms in order to describe their own invention in the best way.

Accordingly, it should be understood that, since the embodiments described in the present specification and the configurations shown in the drawings are only one of the most exemplary embodiments of the present invention and do not represent all the technical spirit of the present invention, there are various equivalents and modification examples that can replace them at the time of the present application.

Embodiment 1

A backwashing suction device for a fabric filtration apparatus according to Embodiment 1 of the present invention includes a suction body 100 in a container shape and a suction plate 200 having at least one main slit 210' and at least one sub-slit 210" to be mounted on the suction body 100 so as to face a fiber disk filter D installed on a shaft S and to perform backwashing as shown in FIGS. 1 through 6.

In particular, a slope 211 is formed on a surface coming in contact with a pile thread F when the pile thread F suctioned thereinto exits so that a width cross section becomes a wedge shape and foreign substances adhered to the pile thread F while moving pressed against the slope 211 so that direction change occurs may be removed to increase the backwashing effect and the pile thread F is swept by an edge of the wedge to minimize the use of backwashing water used for backwashing while enhancing the backwashing effect on various types of pile threads F.

Hereinafter, these components will be described in more detail as follows. Here, a reference symbol "T" represents a filtration tank, a reference symbol "S" represents a shaft installed to rotate in place in the filtration tank and to discharge filtered water to the outside, a reference symbol "D" represents a fiber disk filter installed on the shaft S at predetermined intervals and for substantially filtering, and a reference symbol "F" represents each pile thread that forms an outer surface of the fiber disk filter D and substantially filters. Also, in the drawings, the arrows indicate a direction in which the fiber disk filter D rotates during backwashing.

A. Suction Body

Figure 2:
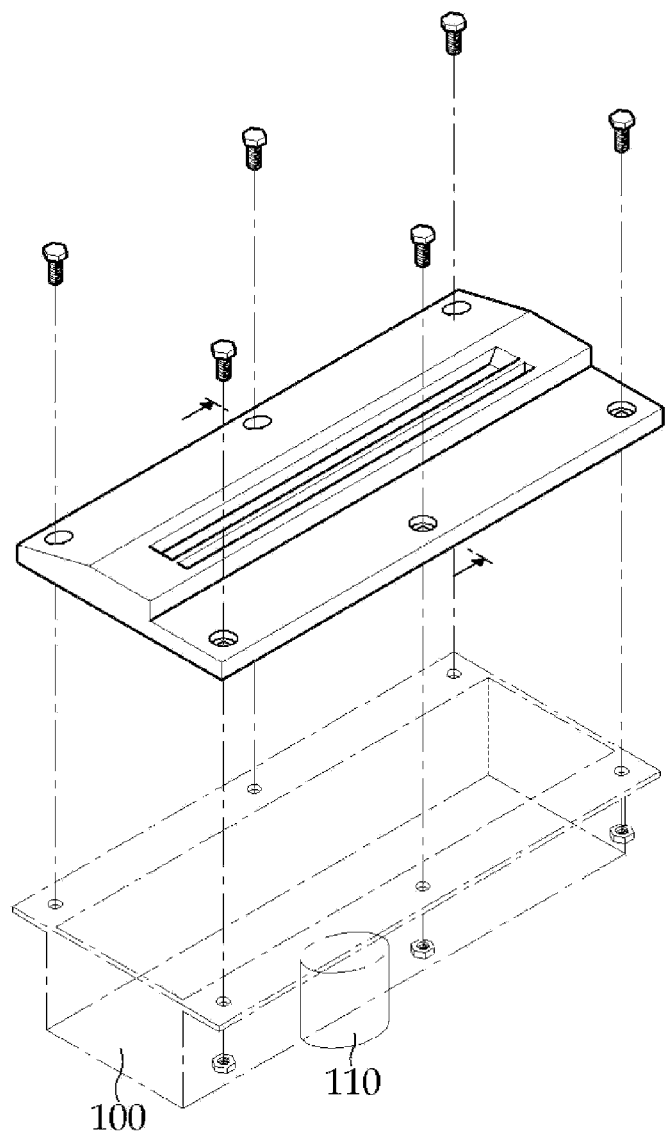
FIG. 2 is an exploded perspective view illustrating the configuration of a backwashing suction device according to Embodiment 1 of the present invention.
Figure 3:
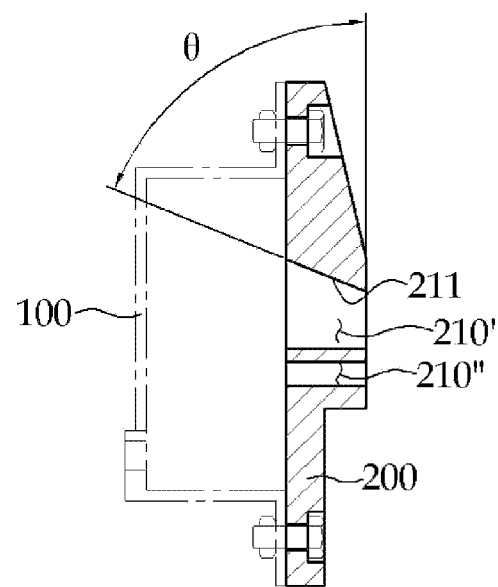
FIG. 3 is a cross-sectional view taken along line A-A of FIG. 2 so as to show a combined state of the backwashing suction device according to Embodiment 1 of the present invention.
Figure 4A:
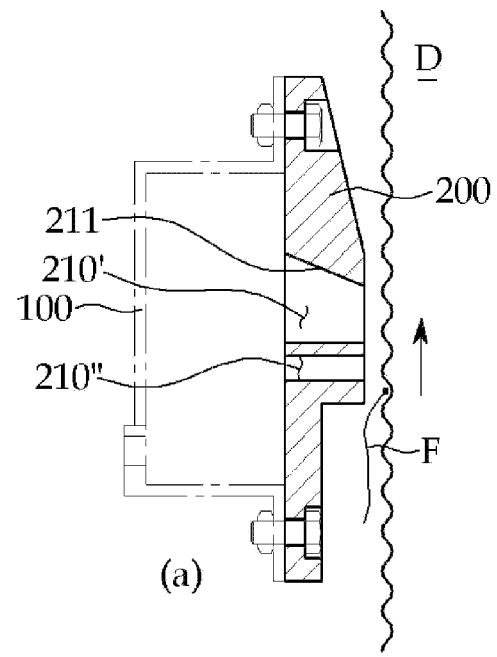
Figure 4B:
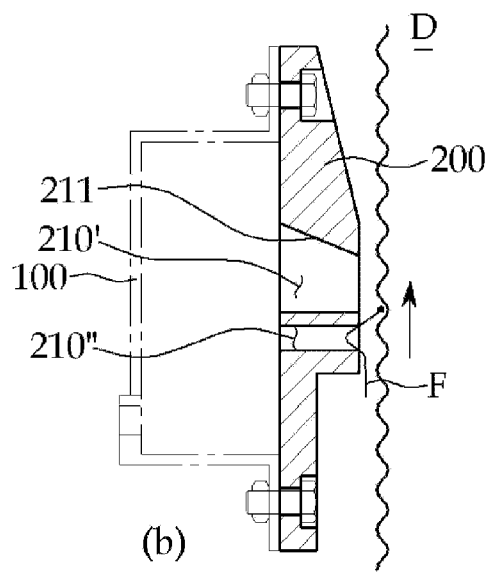
Figure 5A:
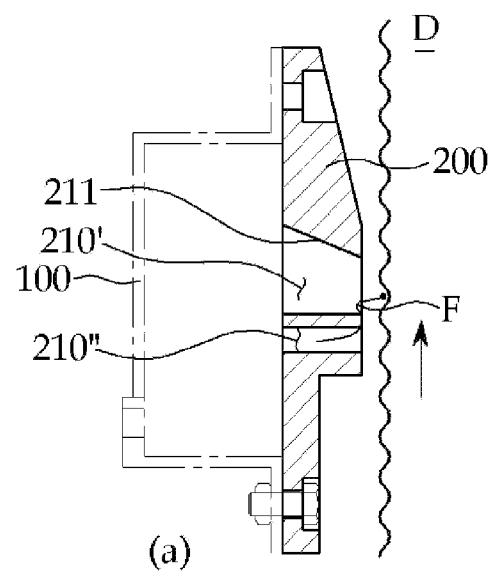
Figure 5B:
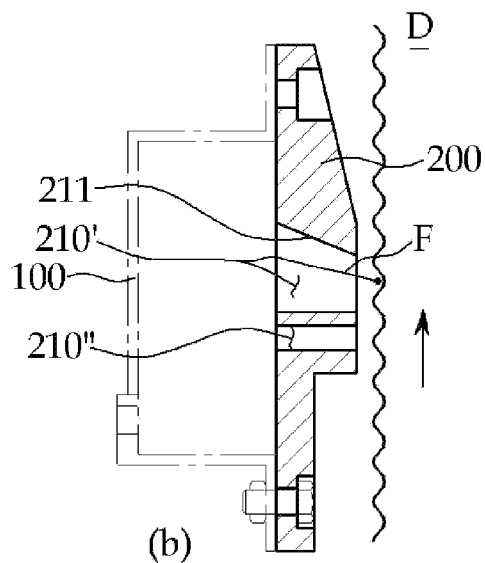

The suction body 100, as shown in FIGS. 1 through 3, has a container shape having one open side and is closed by attaching the suction plate 200 to be described below to an inlet portion which is the open side.

In addition, the suction body 100 is configured in such a way that, as shown in FIG. 2, a drain hole 110 is formed, an actuator such as a pump is connected to the drain hole 110, and the contents inside the suction body 100 are discharged out of the filtration tank T. In this case, the drain hole 110 is described as an example in which the drain hole 110 is formed on the floor in FIG. 2. However, the present invention is not limited thereto, and the drain hole 110 may be formed anywhere, such as at both ends or sides, as long as a position allows the contents inside the suction body 100 to be discharged.

Preferably, the suction body 100, as shown in FIG. 1, is manufactured to make a length sufficient for being encountered by a minimum length along a radial direction of the fiber disk filter D so that frictional resistance between the suction plate 200 to be described below and the fiber disk filter D can be minimized In addition, the suction body 100 may be manufactured by various methods such as pressing a metal plate to form a container or injection molding a synthetic resin.

B. Suction Plate

The suction plate 200 is a plate member having a predetermined thickness, as shown in FIGS. 2 and 3, and having at least one main slit 210' and at least one sub-slit 210" which are formed on an upper surface of the suction plate 200 in the length direction.

1. Main Slit

When the main slit 210' faces the suction body 100 and is parallel thereto in the radial direction of the fiber disk filter D, as shown in FIGS. 2 and 3, the main slit 210' is manufactured in a length sufficient for suctioning the pile thread F that constitutes the exterior of the fiber disk filter D. In addition, the width of the main slit 210' is formed in such a way that, as shown in FIGS. 5A, 5B, 6A, and 6B, when the pile thread F passes through the main slit 210', the pile thread F passes through the main slit 210' and is formed in a width sufficient for being introduced into the suction body 100.

In particular, in an exemplary embodiment of the present invention, the main slit 210' is manufactured in such a way that, as shown in FIGS. 3 through 6B, a surface, which comes in contact with the pile thread F when the pile thread F introduced into the main slit 210' exits, is gradually widened in an inward direction from an inlet of the main slit 210' to form the slope 211 so that the width cross section becomes a wedge shape. This allows the pile thread F introduced into the suction body 100 to be pressed against this slope 211 as the fiber disk filter D rotates, as shown in FIGS. 5A thru 6B, and in particular, as the pile thread F is forcibly pulled, foreign substances adhered to the surface of the pile thread F are scraped off through the end of the wedge, thereby improving the effect of removing the foreign substances.

Furthermore, when the pile thread F that is lying before reaching the main slit 210' reaches the main slit 210' and receives a suction force, the pile thread F spreads along the slope 211, so that, compared to the case of a slit according to the related art where no slope is formed, a flow rotation angle of the pile thread F at which the lying pile thread F is unfolded is formed to be large by an inclination angle of the slope 211 and thus the separation of the foreign substances attached to the pile thread F using an increase in the centrifugal force can be promoted.

In addition, in an exemplary embodiment of the present invention, the main slit 210', as shown in FIG. 3, is configured in such a way that an angle θ formed between the slope 211 and the outer surface of the suction plate 200 is in the range of 5° to 30° and thus the effect of scraping off the foreign substances stuck to the pile thread F through this wedge portion can be further increased. In this case, it is preferable that the wedge-shaped end is formed not to be too sharp to increase the effect of removing the foreign substances without being damaged or cut while the pile thread F ascends over the wedge portion.

2. Sub-Slit

The sub-slit 210" is formed parallel with the main slit 210' described above as shown in FIGS. 2 and 3. In this case, the sub-slit 210", as shown in FIGS. 4A, 4B, 5A, and 5B, is configured to remove the foreign substances adhered to the surface of the pile thread F while the end of the pile thread F extends over the edge of the sub slit 210" and is not completely unfolded. This is to ensure that, as the fiber disk filter D continues to rotate, the pile thread F is always stretched across the sub-slit 210" in the width direction and in this way, backwashing is continuously performed at the portion stretched across the sub-slit 210" and as a result, backwashing is continuously performed over the entire length of the pile thread F.

In an exemplary embodiment of the present invention, one to five sub-slits 210" are formed through the suction plate 200 and to be parallel so as to be adjacent to one main slit 210' so that the pile thread F is stretched across the sub-slit 210" over the entire length, and thus the backwashing effect can be further enhanced by repeatedly performing backwashing.

The suction plate 200 made as described above may be manufactured by injection molding a synthetic resin, as shown in FIG. 2, and may be easily assembled to the suction body 100 through a fastening unit such as bolts. In addition, when injection molding with the synthetic resin, the suction body 100 may be integrally injection-molded using an insert method, or the suction body 100 and the suction plate 200 may be integrally formed using the synthetic resin.

As described above, according to the present invention, a slope is formed on the surface of the main slit through which the pile thread introduced into the main slit exits so that, when the pile thread exits the main slit, the pile thread ascends over the wedge-shaped surface so that the foreign substances adhered to the pile thread are scraped off through the wedge and thus, the backwashing effect can be enhanced. Also, the amount of angular rotation of the pile thread is increased along the slope as the pile thread that is lying before reaching the main slit at the time of backwashing extends along the slope as much as the inclination angle of the slope compared to the case where no slope is formed so that the removal of the foreign substances using an increase in the centrifugal force received by the pile thread can be promoted. Accordingly, not only the backwashing effect but also the use of backwashing water required for backwashing can be reduced by about 10% to 30% compared to the related art.

Embodiment 2

The backwashing suction device for a fabric filtration apparatus according to Embodiment 2 of the present invention has the same configuration as in Embodiment 1 described above, as shown in FIGS. 7 and 8, but there is a difference in the addition of friction protrusions 211' on the slope 211. Thus, here, a detailed description of the same configuration as in Embodiment 1 is omitted, and only the additional components will be described.

Figure 7:
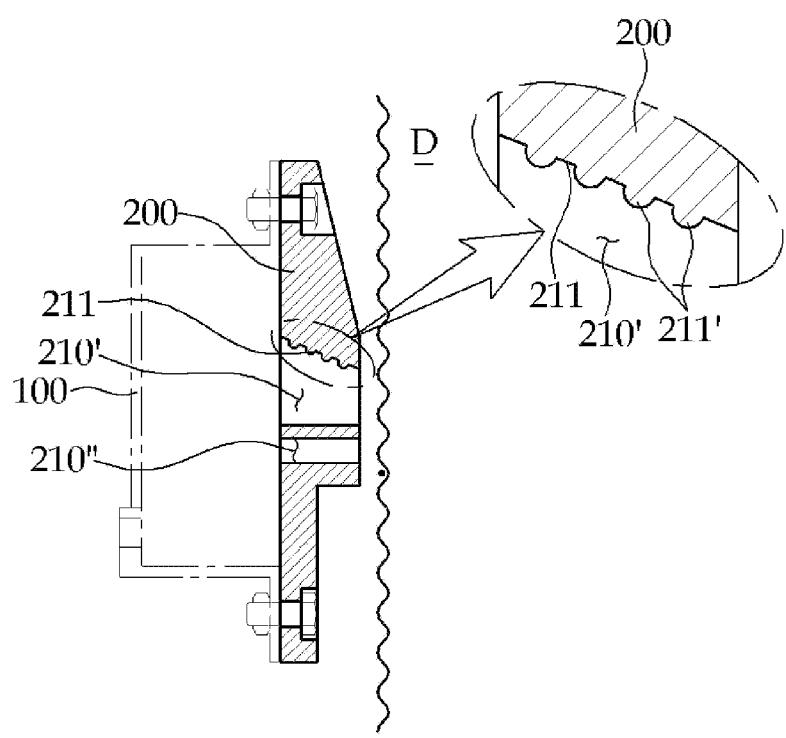
FIG. 7 is a cross-sectional view illustrating a combined state of a backwashing suction device according to Embodiment 2 of the present invention.
Figure 8:
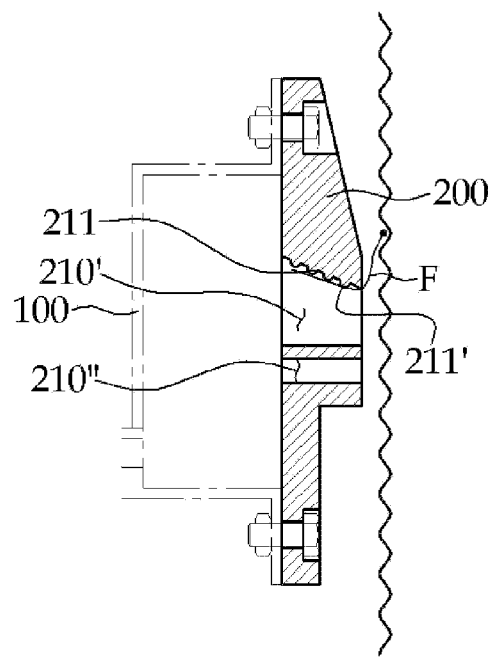
FIG. 8 is a cross-sectional view illustrating a state in which pile threads are backwashed by the backwashing suction device according to Embodiment 2 of the present invention.

In Embodiment 2, as shown in FIGS. 7 and 8, a plurality of friction protrusions 211' are formed to protrude from the slope 211. This is to ensure that, as the fiber disk filter D rotates while being backwashed, together with the effect that the pile thread F is pulled in contact with the slope 211 and the pile thread F is scraped off by the wedge portion, the effect of rubbing and washing the pile thread F on the washboard by repeating the pile thread F to be repeatedly pressed against and separated from the friction protrusions 211', thereby further increasing the backwashing effect.

In this case, the friction protrusions 211' are long and formed to protrude in the longitudinal direction of the main slit 210' so that the pile thread F ascends over the adjacent friction protrusions 211' and such a backwashing effect can be further increased.

Embodiment 3

Figure 9:
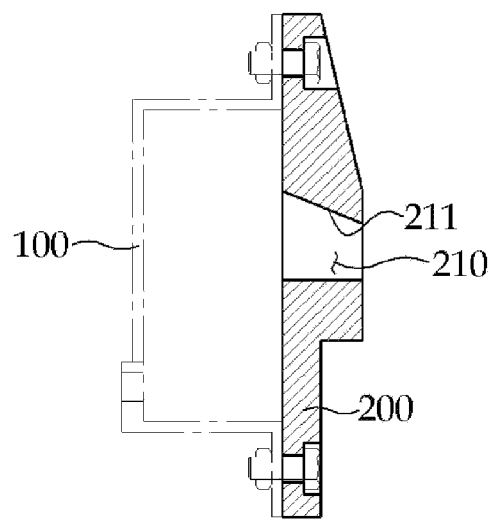
FIG. 9 is a cross-sectional view illustrating a combined state of a backwashing suction device according to Embodiment 3 of the present invention.

The backwashing suction device for a fabric filtration apparatus according to Embodiment 3 of the present invention includes a suction body 100 and a suction plate 200 having at least one suction slit 210 and closing an inlet portion of the suction body 100, as shown in FIG. 9, wherein a slope 211 is formed in the suction slit 210 in such a way that an inner surface of an edge through which the pile thread F introduced into the suction slit 210 exits, is gradually widened in an inward direction from the inlet of the suction slit 210.

The configuration of the suction slit 210 is the same as the main slit 210' of the Embodiment 1, as shown in FIG. 9, and the overall configuration of Embodiment 3 is the same as the configuration formed by subtracting the sub-slit 210" from the configuration of Embodiment 1. Thus, the configuration of Embodiment 3 corresponding to Embodiment 2 has already been described in the Embodiment 1. Thus, here, a detailed description of the configuration corresponding to Embodiment 2 will be omitted.

In a backwashing suction device for a fabric filtration apparatus according to the present invention, the following effects are obtained.

(1) A slope is formed on the surface of a suction slit that comes in contact with a pile thread as the pile thread suctioned into a main slit exits so that, as the pile thread comes into contact with the surface of the suction slit and ascends over the suction slit, the amount of rotation of the pile thread is increased, thereby enhancing the backwashing effect by removing foreign substances from the pile thread using an increase in the centrifugal force acting on the pile thread.

(2) In particular, since the foreign substances are removed from the pile thread by using a slope shape, the foreign substances can be easily and quickly removed from various types of pile threads. Accordingly, when the foreign substances are removed to the same degree, the amount of backwashing water used for backwashing can be reduced by about 10% to 30%.

(3) On the other hand, a plurality of friction protrusions are formed to protrude from the slope so that the backwashing effect can be further enhanced through the effect of removing the foreign substances by rubbing the pile thread through the washboard effect as well as brushing using such an increase in centrifugal force.

(4) In this case, since the friction protrusions are long and formed to protrude in the length direction of the suction slit, the rubbing effect while the pile thread ascends over each friction protrusion is obtained so that the backwashing effect can be further enhanced.

What is claimed is:

1. A backwashing suction device for a fabric filtration apparatus, the backwashing suction device comprising:
   a suction body formed in a container shape and having a drain hole through which contents inside the suction body are discharged to the outside; and
   a suction plate mounted on the suction body so that an inlet portion of the suction body is closeable and having at least one main slit and at least one sub-slit to perform backwashing,
   wherein the main slit forms a slope so that an inner surface of an edge through which pile threads (F) introduced into the main slit exit is gradually widened in an inward direction from an inlet of the main slit, and
   a plurality of friction protrusions are formed to protrude from the slope, and as a fiber disk filter (D) rotates while being backwashed, the pile threads (F) are repeatedly pressed against and separated from the friction protrusions.

2. A backwashing suction device for a fabric filtration apparatus, the backwashing suction device comprising:
   a suction body formed in a container shape and having a drain hole through which contents inside the suction body are discharged to the outside; and a suction plate mounted on the suction body so that an inlet portion of the suction body is closeable and having at least one suction slit to perform backwashing, wherein the suction slit forms a slope so that an inner surface of an edge through which pile threads (F) introduced into the suction slit exit is gradually widened in an inward direction from an inlet of the suction slit, and a plurality of friction protrusions are formed to protrude from the slope, and as a fiber disk filter (D) rotates while being backwashed, the pile threads (F) are repeatedly pressed against and separated from the friction protrusions.

3. The backwashing suction device of claim 1, wherein an angle between the slope and an outer surface of the suction plate is in a range of 5° to 30°.

4. The backwashing suction device of claim 2, wherein an angle between the slope and an outer surface of the suction plate is in a range of 5° to 30°.

* * * * *